(12) United States Patent
Kimura et al.

(10) Patent No.: US 8,491,017 B2
(45) Date of Patent: Jul. 23, 2013

(54) FITTING STRUCTURE INCLUDING A PAIR OF CONNECTION PIPES AND A CLAMP RING

(75) Inventors: Miyoshi Kimura, Shinagawa-ku (JP); Yusuke Nagase, Shinagawa-ku (JP); Yoshiki Adachi, Shinagawa-ku (JP)

(73) Assignee: Ihara Science Corporation, Tokyo (JP)

( * ) Notice: Subject to any disclaimer, the term of this patent is extended or adjusted under 35 U.S.C. 154(b) by 950 days.

(21) Appl. No.: 12/094,946

(22) PCT Filed: Nov. 17, 2006

(86) PCT No.: PCT/JP2006/322936
§ 371 (c)(1),
(2), (4) Date: May 23, 2008

(87) PCT Pub. No.: WO2007/063717
PCT Pub. Date: Jun. 7, 2007

(65) Prior Publication Data
US 2008/0290658 A1      Nov. 27, 2008

(30) Foreign Application Priority Data

Nov. 29, 2005  (JP) ................................ 2005-344460
Apr. 13, 2006  (JP) ................................ 2006-110828

(51) Int. Cl.
*F16L 23/00*     (2006.01)
(52) U.S. Cl.
USPC ............................ 285/367; 285/408; 285/411
(58) Field of Classification Search
USPC .......................... 285/367, 368, 379, 408–411
See application file for complete search history.

(56) References Cited

U.S. PATENT DOCUMENTS 1,834,581 A * 12/1931 Ferrell et al. .................. 285/328
2,895,748 A *  7/1959 Oldham ........................ 285/410

(Continued)

FOREIGN PATENT DOCUMENTS

JP       139614/1974        12/1974
JP        47174/1986         3/1986

(Continued)

OTHER PUBLICATIONS

Swagelok Co., "Gaugeable Tube Fittings and Adapter Fittings", catalog published Aug. 2004, pp. 2,10,11,51,52,53,58-62.

(Continued)

*Primary Examiner* — Daniel P. Stodola
*Assistant Examiner* — James Linford
(74) *Attorney, Agent, or Firm* — DLA Piper LLP (US)

(57) ABSTRACT

An engagement section of a holder is engaged with a metal gasket, the gasket is received in a tubular section, and the tubular section is fitted in a step of a connection pipe. Another connection pipe is placed close to and facing the connection pipe that holds the gasket through the holder, and a center ring is installed surrounding the outer peripheries of the flanges. While a trapezoidal section having slopes which define both sides is inserted into a groove, center ring segments are closed to form a ring shape. A bolt which penetrates through a cutout of a segment is screwed into a threaded hole of the segment. The screwing of the bolt causes the amount of insertion of the trapezoidal section, which has slopes which define both sides, into the groove to be increased. As a result, the distance between flanges is reduced and the contact pressure of projections against both sides of the gasket is increased.

6 Claims, 12 Drawing Sheets

U.S. PATENT DOCUMENTS

| | | | | |
|---|---|---|---|---|
| 3,484,912 | A | * | 12/1969 | Crain .............................. 24/279 |
| 4,552,389 | A | | 11/1985 | Babuder et al. |
| 4,568,115 | A | * | 2/1986 | Zimmerly ..................... 285/411 |
| 4,838,583 | A | * | 6/1989 | Babuder et al. ............... 285/354 |
| 5,011,196 | A | * | 4/1991 | Sabatier et al. ............... 285/367 |
| 5,106,128 | A | | 4/1992 | Dugast et al. |
| 5,423,580 | A | * | 6/1995 | Mohlenkamp et al. ....... 285/379 |
| 6,234,545 | B1 | | 5/2001 | Babuder et al. |

FOREIGN PATENT DOCUMENTS

| | | |
|---|---|---|
| JP | 62-087285 | 6/1987 |
| JP | 01-203789 | 8/1989 |
| JP | 2-66390 A | 3/1990 |
| JP | 62756/90 | 12/1990 |
| JP | 05-149488 A | 6/1993 |
| JP | 07-158783 A | 6/1995 |
| JP | 9-196261 A | 7/1997 |
| JP | 10-169881 | 6/1998 |
| JP | 2001-165366 A | 6/2001 |
| JP | 2005-195164 A | 7/2005 |
| JP | 2005-273868 | 10/2005 |

OTHER PUBLICATIONS

Parker Hannifin Corp, "CPI Tube Fitting", catalog published Feb. 2000, pp. 3 and 6.

English Abstract of JP-9-196261A.
English Language translation of JP-47174/1986.
English Abstract of JP-2-66390A.
English Abstract of JP-2001-165366A.
English Language translation of JP-139614/1974.
English Abstract of JP-05-149488A.
English Abstract of JP-07-158783A.
English Abstract of JP-2005-195164A.
English Abstract of JP-01-203789.
Search Report of PCT/JP2006/322936.
International Preliminary Report on Patentability issued in Application No. PCT/JP06/322936 mailed Jun. 12, 2008.
Written Opinion issued in Application No. PCT/JP06/322936 published Jun. 3, 2008.
Japanese Office Action cited in JP 2006-110828 dated Feb. 2, 2012.
English language abstract of JP 10-169881 published on Jun. 26, 1998.
English language translation of JP 10-169881 published on Jun. 26, 1998.
English language abstract of JP 2005-273868 published on Oct. 6, 2005.
English language translation of JP 2005-273868 published on Oct. 6, 2005.

* cited by examiner

FITTING STRUCTURE INCLUDING A PAIR OF CONNECTION PIPES AND A CLAMP RING

TECHNICAL FIELD

The present invention relates to a fitting structure for connection of connection pipes.

BACKGROUND ART

In semiconductor manufacturing apparatuses, general industrial machines and the like, conduit configurations including connection pipes are used for transporting fluids such as air, pure water, cooling water or hot water for temperature adjustment, organic chemical liquids, and the like. Such conduit configurations include a fitting structure for connecting a connection pipe to another member, for example, another connection pipe, or a fluid inlet/outlet of a housing of an apparatus.

Conventionally, as a fitting structure for connecting a pair of connection pipes to each other, for example, a configuration in which end faces of respective connection pipes are held in close contact with each other. In this event, an O-ring made of rubber is inserted between both end faces for enhancing the airtightness. Each end face is formed with a groove for holding the O-ring. In this regard, flanges may be formed in some cases on the end faces of the respective connection pipes, respectively.

In recent year, however, in semiconductor manufacturing apparatuses, for example, even a trace of impurities mixed in or even small fluctuations in pressure and in the flow rate of a fluid in a gas supply section which supplies gas to a reaction chamber, in particular, may result in manufacturing of defective products that cannot be used. Accordingly, airtightness at a significantly higher level than before is required for conduit configurations arranged in such positions. As mentioned above, the configuration including O-ring experiences difficulties in accomplishing a very high airtightness due to the nature of rubber which is the material of the O-ring, and reliability is more likely to degrade due to aging changes in the rubber. Further, no one can deny the possibility of modifications in characteristics caused by a chemical reaction of flowing gas and the rubber.

Thus, Japanese Patent Published Examined Application No. 62756/90 proposes a configuration for sandwiching a metal gasket, in place of an O-ring, between end faces of connection pipes (components of fitting). In this configuration, each end face is provided with an annular seal bead (protrusion), such that these seal beads are brought into contact with both sides of the gasket, respectively. In addition, the configuration employs a connecting nut which comprises a female thread in mesh with a male thread on the outer periphery of one connection pipe, and comprises an engagement section in engagement with the other connection pipe. By screwing the male thread of the connecting nut deep into the female thread of the connection pipe, the gasket is strongly pressed from both sides by the respective seal beads on both end faces to accomplish high airtightness.

Also, connection pipes made of metal such as stainless steel and a fitting structure made of metal such as stainless steel may be used in some cases. As a fitting structure made of metal, a double ferrule type fitting structure (see a catalog "(Gaugeable) Tube Fittings and Adapter Fittings" published in August 2004 by Swagelok Co.), or a single ferrule type fitting structure (see "CPI™ Tube Fittings catalog 4230 revised in February 2000" published in February 2000 by Parker Hannifin Corp.) has been used.

As shown in FIG. 1, the configuration described in the catalog of Swagelok Co., which is of a double ferrule type, comprises fitting body 44 having male thread 41 on the outer periphery and having insertion section 43 for metal connection pipe 42 in the inner periphery; nut 47 having female thread 46 in mesh with male thread 41 of fitting body 44; and front ferrule 45 and back ferrule 48 disposed within a space defined by the inner periphery of an end portion of fitting body 44 and the inner periphery of an end portion of nut 47. First engagement face 45a of front ferrule 45 is in engagement with cutout face 44a provided in the interior of the end portion of fitting body 44. First engagement face 48a of back ferrule 48 is in engagement with cutout face 47a provided in the interior of the end portion of nut 47. Then, second engagement face 45b of front ferrule 45 and second engagement face 48b of back ferrule 48 are in engagement with each other.

Accordingly, connection pipe 42 is inserted into insertion section 43 of fitting body 44, and male thread 41 is meshed with female thread 46 while nut 47 positioned on the outer periphery of connection pipe 42 is moved toward fitting body 44. In this event, as nut 47 moves toward fitting body 44, front ferrule 45 approaches back ferrule 48 such that they come into close contact with each other. Then, the end portion of second engagement surface 48b of back ferrule 48 is pressed onto and digs into the outer peripheral surface of connection pipe 42. In this way, connection pipe 42 is held by the end portion of back ferrule 48 that digs into the outer periphery of connection pipe 42.

Though not shown, the catalog of Parker Hannifin Corp. also discloses a fitting structure which includes a single ferrule which has an engagement face in engagement with a cutout face disposed in the interior of an end portion of a fitting body, and an engagement face in engagement with a cutout face disposed in the interior of the end portion of a nut, where the end portion of each engagement face is pressed onto and digs into the outer periphery of a connection pipe.

In this regard, in either configuration, either fitting body 44 or nut 47 is rotated while the other is fixed using, for example, two spanners or the like as tools so that male thread 41 of fitting body 44 is meshed with female thread 46 of nut 47.

DISCLOSURE OF THE INVENTION

In the configuration described in Japanese Patent Published Examined Application No. 62756/90, high airtightness is accomplished by screwing the male thread of one connection pipe deeply into the female thread of the coupling nut, where during the screwing, the other connection pipe may also rotate together with the coupling nut due to a friction force. In this event, friction occurs between the seal bead of the rotating connection pipe and the gasket which the seal bead is in contact with and is pressed by, causing metal particles which float. The particles become impurities which are introduced into a flowing gas. Also, not only the occurrence of the particles, but the rotation of the connection pipe damages a surface seal, which promotes leakage therefrom.

Even supposing that no particle occurs upon completion of assembly of the fitting or that the fitting is brought into service after particles are removed immediately after the completion of assembly, particles may occur during a period of long term use. Specifically, when the other connection pipe rotates together with the rotation of the coupling nut as described above, a leading end portion of the other connection pipe may be held in a twisted state. In this event, the connection pipe can gradually move due to a repelling force thereof in a direction to eliminate the twisted state. Alternatively, inflation or contraction of connection pipe due to fluctuations in temperature reduces a force for fastening a pair of connection pipes to each other, the connection pipe may move in a direction to eliminate the twisted state. As a result, friction occurs between the seal bead and the gasket, possibly causing metal particles which can float. Also, in addition to the occurrence of such particles, force of fastening the pair of connection pipes to each other is reduced and therefore holding force is reduced and it facilitates leakage.

As described above, according to the configuration of Japanese Patent Published Examined Application No. 62756/90, while high airtightness of the fitting structure against the outside can be achieved, metal particles can occur in the interior of the fitting structure, and these particles constitute impurities which can be introduced into a fluid which communicates through the fitting structure. In particular, when this fitting structure is employed in a gas supply section of a semiconductor manufacturing apparatus, the introduction of the particles as impurities which are caused by the friction between the seal bead and the metal gasket would cause a critical problem which disables manufacturing of the desired semiconductor.

On the other hand, in the double ferrule type fitting structure described in the catalog of Swagelok Co., front ferrule 45 comes into close contact with back ferrule 48 such that it is sealed by screwing male thread 41 of fitting body 44 deep into female thread 46 of nut 47, thereby accomplishing high airtightness. Likewise, in the single ferrule type fitting structure described in the catalog of Parker Hannifin Corp., both end portions of the ferrule dig strongly into the outer periphery of the connection pipe by screwing the male thread of the fitting body deep into the female thread of the nut, thereby accomplishing high airtightness. Accordingly, the male thread needs to be screwed into the female thread to a sufficient degree, i.e., a sufficient number of rotations to sufficiently fasten both threads 41, 46 in order to achieve good airtightness.

However, during this screwing, as is the case with the aforementioned case, connection pipe 42 positioned on the inner peripheral side of nut 47 rotates together with nut 47 due to a friction force, so that a leading end portion of connection pipe 42 may be held in a twisted state in some cases. In this event, number of rotations to sufficiently fasten both threads 41, 46 cannot be performed, resulting in an insufficient airtightness of the connection of nut 47 with fitting body 44 and resulting in a higher likelihood of leakage.

When the number of rotations to sufficiently fasten both threads 41, 46 cannot be ensured, it is desirable to relatively rotate fitting body 44 and nut 47 again until the predefined number of rotations for fastening is reached, but sometimes, a sufficient space is not provided for handling tools such as a spanner for fastening. Specifically, in a state in which the fitting structure has been completed by screwing male thread 41 of fitting body 44 into the female thread 46 of nut 47, a sufficiently wide space is not available around the fitting structure, but instead, a variety of members which comprise a conduit, a part of a housing of an apparatus, and the like often exist. Also, a semiconductor manufacturing apparatus or the like may be provided with multiple conduit configurations, where the aforementioned fitting structure may be included in respective conduits. In such a case, it is difficult for an operator to freely handle tools such as a spanner. In particular, in the configuration as shown in FIG. 1, it is necessary to use two spanners, i.e., a spanner for fixing fitting body 44 so that fitting body 44 will not rotate, and a spanner for rotating nut 47. Moreover, large strokes are preferably ensured for the spanners during the operation in order to apply a relatively large force for efficient and secure fastening. In this event, unless there is a sufficient free space around the fitting structure, the operator experiences difficulties in the operation when using two spanners, possibly resulting in a failure to provide a sufficient fastening force. In addition, the operation of re-fastening is particularly difficult when the fastening is loosened after once the fastening has been completed.

It is an object of the present invention to provide a fitting structure which prevents a connection pipe from being held in a twisted state, is capable of connecting connection pipes with high airtightness and high reliability as compared with a configuration which employs a metal gasket, and is less likely to cause metal particles to be present in the interior.

A feature of the present invention lies in a fitting structure for connecting a pair of connection pipes each having a flange provided with an annular projection at one a leading end portion, wherein the fitting structure comprises:

a flat ring-shaped metal gasket pressed by the each projection from both sides in a state where the flanges of the pair of connection pipes are opposite to each other;

a holder having an engagement section for engagement with at least a part of the metal gasket, and held by one of the connection pipes;

a center ring mountable to surround the outer peripheries of both the flanges in a state in which the flanges of the pair of connection pipes are opposite to each other across the metal gasket; and a clamp ring comprising a plurality of segments arranged in sequence and coupled such that adjacent ones are pivotally attached to one another for defining a ring shape by all segments to cover and hold the overall outer peripheries of the flanges being opposite to each other across the metal gasket when a segment of the plurality of segments positioned at one end and a segment positioned at the other end are fixed to each other by a fastening member, wherein the each flange has a slope which is downwardly inclined from the outer periphery of the each flange respectively toward a side opposite to the leading end, and wherein each the segment of said clamp ring has a corresponding slope respectively corresponding to the slope of each flange on the inner periphery.

In a state in which the clamp ring defines the ring shape to cover and hold the overall outer peripheries of the flanges opposite to each other across the metal gasket, as the fastening member brings the segment at the one end and the segment at the other end into closer proximity to each other, each segment of the clamp ring moves inward in a radial direction for more tightly holding the flanges to each other while each corresponding slope slides along each slope of each flange.

According to this configuration, the airtightness is high because the metal gasket is used for sealing rather than an O-ring made of rubber, and moreover, since the connection pipes do not undergo twisting during assembly, no friction will occur between the projections of the connection pipes and the metal gasket, thereby eliminating the possibility of causing particles.

Another feature of the present invention lies in a fitting structure for connecting connection pipes which comprises:

a fitting body integrally provided with a fitting body side flange member at a leading end portion thereof, and having an insertion section on the inner periphery thereof, into which the connection pipe is inserted from the leading end side;

a connection pipe side flange member disposed on the outer periphery of said connection pipe;

a ferrule held on the outer periphery of the connection pipe;

a center ring mountable to surround the outer peripheries of both flange members in a state in which a leading end of the connection pipe side flange member is opposite to a leading end of the fitting body side flange member;

a clamp ring comprising a plurality of segments arranged in sequence and coupled such that adjacent ones are pivotally attached to one another for defining a ring shape by all segments for covering and holding the overall outer peripheries of the flange members having the leading ends opposite to each other when a segment of plurality of segments positioned at one end and a segment positioned at the other end are fixed to each other by a fastening member, wherein each flange member has a slope which is downwardly inclined from the outer periphery of each flange toward a side opposite to the leading end, wherein each segment of the clamp ring has a corresponding slope respectively corresponding to the slope of each flange member on the inner periphery, and wherein the ferrule extends from the inner periphery of the leading end portion of the connection pipe side flange member to the inner periphery of the leading end portion of the fitting body side flange member.

In this event, another connection pipe may be inserted from a side of the fitting body opposite to the fitting body side flange member, and the connection pipe is connected to another connection pipe through an internal space of the fitting body.

A further feature of the present invention lies in a fitting structure for connecting a pair of connection pipes which comprises:

a fitting body integrally provided with fitting body side flange members at both end portions, and having a pair of insertion sections in the inner periphery for inserting the pair of connection pipes thereinto from both sides;

a pair of connection pipe side flange members disposed on the outer peripheries of the pair of connection pipes, respectively;

a pair of ferrules held on outer peripheries of both connection pipes, respectively;

a pair of center rings disposed at both end portions of the fitting body, respectively, and mountable to surround the outer peripheries of both flange members in a state in which a leading end of each connection pipe side flange member is opposite to the leading end of each fitting body side flange member; and a pair of clamp rings each comprising a plurality of segments arranged in sequence and coupled such that adjacent ones are pivotally attached to one another for defining a ring shape by all segments to cover and hold the overall outer peripheries of the flange members having leading ends opposite to each other when a segment of plurality of segments positioned at one end and a segment positioned at the other end are fixed to each other by a fastening member, wherein each flange member has a slope which is downwardly inclined from the outer periphery of each flange member respectively toward a side opposite to the leading end, wherein each segment of the clamp ring has a corresponding slope respectively corresponding to the slope of each flange member on the inner periphery, wherein the ferrule extends from the inner periphery of the leading end portion of the connection pipe side flange member to the inner periphery of the leading end portion of the fitting body side flange member, and wherein connection structures are built respectively at both end portions of the fitting body for connecting the connection pipes and the fitting body by the fitting body side flange member and the connection pipe side flange member which are held by the center rings and the clamp rings in a state in which the leading ends of the fitting body side flange member and the connection pipe side flange member are opposite to each other, whereby the pair of connection pipes are connected through an internal space of the fitting body.

In these configurations, since a nut is not meshed with the fitting body in order to fix the connection pipes to the fitting body for hermetic sealing, the connection pipes are not likely to undergo twisting during assembling. Accordingly, the connection is not likely to loosen in association with aging changes and fluctuations in temperature and humidity. Consequently, a highly hermetic connection can be made.

The ferrule may comprise a front ferrule having a first engagement face for engagement with a cutout face on the inner periphery of the fitting body side flange member and having a second engagement face positioned on the side opposite to the first engagement face, and a back ferrule having a first engagement face for engagement with a cutout face on the inner periphery of the connection pipe side flange member and having a second engagement face positioned on the side opposite to the first engagement face and capable of tightly joining with the second engagement face of the front ferrule. Then, as the leading ends of the fitting body side flange member and connection pipe side flange members are brought into closer proximity to each other, the second engagement face of the front ferrule may be more tightly joined with the second engagement face of the back ferrule. Further, the second engagement face of the front ferrule and the second engagement face of the back ferrule form an angle larger than that formed by the first engagement face of the front ferrule and the cutout face on the inner periphery of the fitting body side flange member with respect to a longitudinal direction of the connection pipes, as viewed from the back ferrule, and the first engagement face of the back ferrule and the cutout face on the inner periphery of the connection pipe side flange member may form an obtuse angle with respect to the longitudinal direction of the connection pipes, as viewed from the back ferrule.

In a state in which the clamp ring defines the ring shape for covering and holding the overall outer peripheries of each leading end portion of the flange members that are opposite to each other, as the fastening member brings the segment at the one end and the segment at the other end into closer proximity to each other, each segment of the clamp ring moves inwardly in a radial direction while each corresponding slope slides along each slope of each flange member to cause the leading ends of the flange members to come closer to each other, to enhance airtightness of the seal by means of the ferrule.

The fastening member may be a bolt for screwing the segment at the one end to the segment at the other end, and the fastening member can bring both segments into closer proximity to each other as the bolt is screwed deeper. In this event, a head section of the bolt and a segment for engaging the head section of the bolt, of the segments preferably have their respective contact portions formed in a spherical shape.

Also, the fastening member may be an eyebolt comprising a stop section attached to one segment of the segment at one end and the segment at the other segment, a thread section extending from the stop section, and a nut in mesh with the thread section and in engagement with the other segment, wherein as the thread section is screwed deeper into the nut, the other segment which is in engagement with the nut can be brought closer to the one segment. In this event, the nut and the other of the segments preferably have their respective contact faces formed in a spherical shape.

According to the fitting structure of the present invention, since the connection pipes will never be held in a twisted state, high airtightness to the outside of the fitting can be ensured in a simple configuration. Then, a high airtightness to the outside of the fitting can be accomplished together with the prevention of the occurrence of particles which are impurities in the interior of the fitting.

Further, according to the present invention, the fastening member may be tightly fastened to improve the reliability of the connection. In particular, when a bolt and a nut or an eyebolt, for example, is used as the fastening member, a screw driver, a wrench, or the like may be simply rotated without using a plurality of spanners or the like. The bolt and nut or the eyebolt may be relatively small as compared with the size of the overall fitting, and moreover do not require as large stroke as a spanner. Thus, a connection operation can be performed with high workability to improve the reliability of the connection even when multiple conduit configurations are provided and each of conduits includes a fitting structure.

BEST MODE FOR CARRYING OUT THE INVENTION

In the following, embodiments of the present invention will be described with reference to the drawings.

First Embodiment

Figure 1:
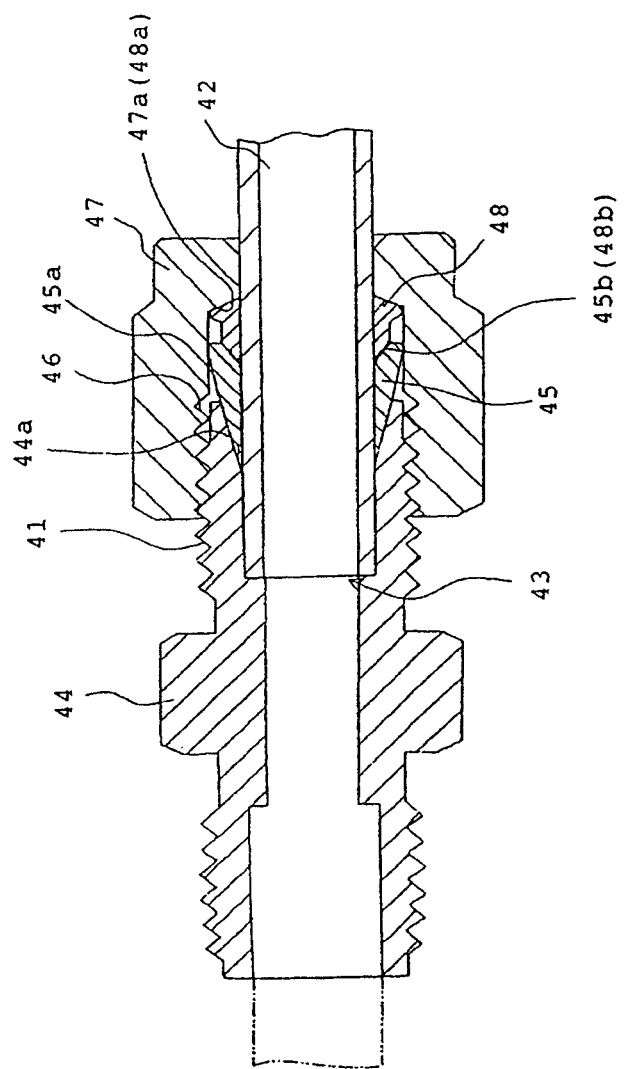
[FIG. 1] A front cross-sectional view of a conventional fitting structure
Figure 2A:
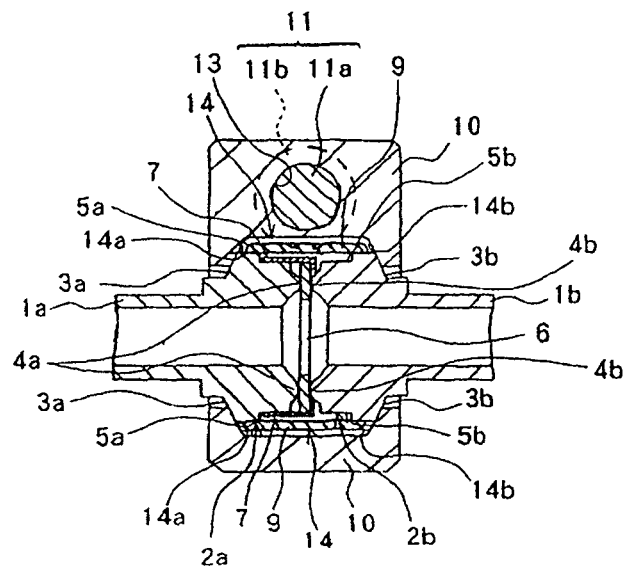
[FIG. 2A] A front cross-sectional view of a fitting structure of a first embodiment of the present invention
Figure 2B:
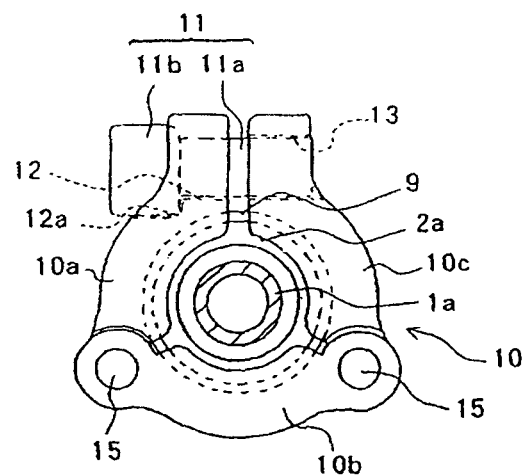
[FIG. 2B] A side view of the fitting structure of the first embodiment of the present invention
Figure 14:
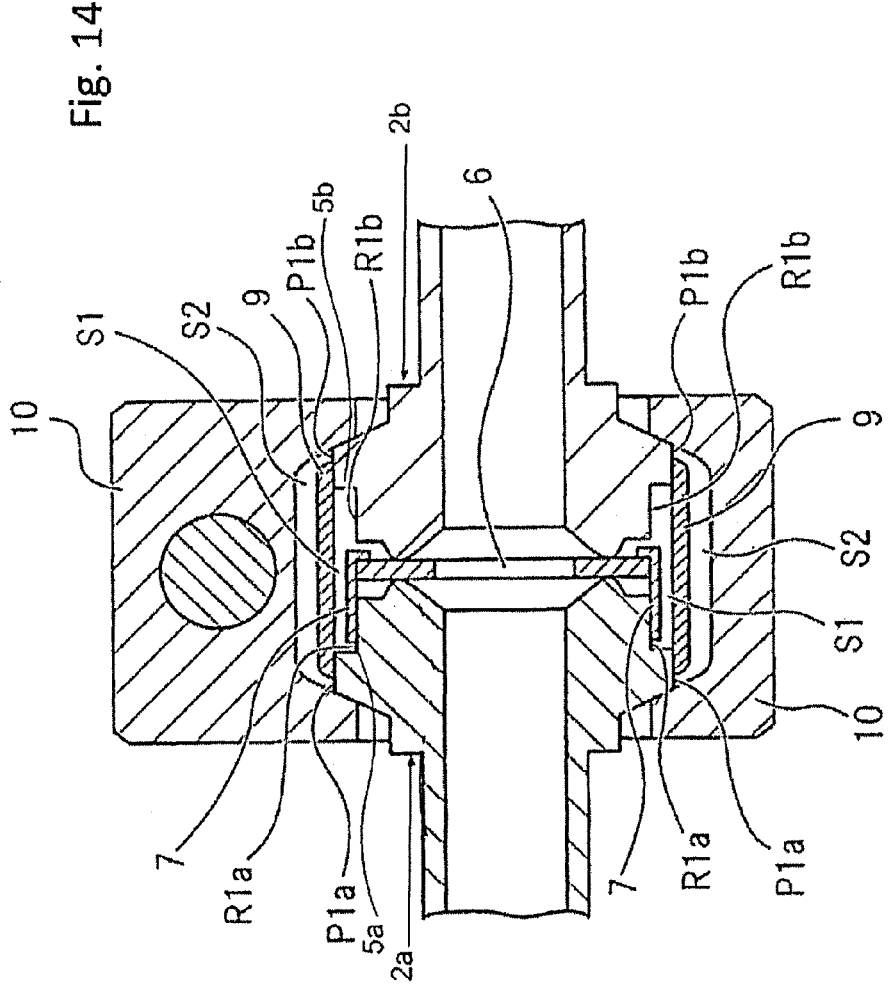
[FIG. 14] A front cross-sectional view of a fitting structure of a first embodiment of the present invention.

A fitting structure in a completed state of a first embodiment of the present invention is shown in FIGS. 2A, 2B, and 14. The fitting structure of this embodiment is intended to hermetically connect a pair of connection pipes 1a, 1b. These connection pipes 1a, 1b are formed with flanges 2a, 2b, respectively, on their end portions. Flanges 2a, 2b have slopes 3a, 3b, respectively, which are downwardly inclined toward the side opposite to the leading end of connection pipes 1a, 1b from their outer peripheries. The opposite faces of flanges 2a, 2b (end faces of connection pipes 1a, 1b) are formed with annular projections (seal beads) 4a, 4b. Respective projections 4a, 4b of both flanges 2a, 2b are formed in the same shape and same dimensions. Each slope 3a, 3b is provided on the side opposite to the each opposite face of flanges 2a, 2b (side opposite to the each end face of connection pipes 1a, 1b), so that as both connection pipes 1a, 1b are arranged in close proximity such that the end faces are opposite to each other. Therefore, a trapezoidal section (section having a trapezoidal cross-sectional shape) with both slopes 3a, 3b which define the sides is formed. In this event, the leading ends of projections 4a, 4b are opposite to each other. Flanges 2a, 2b are formed with steps 5a, 5b on each opposite faces. These steps 5a, 5b define a small-diameter cylinder on which tubular section 7b of holder 7, later described, is fitted. In this regard, connection pipes 1a, 1b may be parts of long pipes which allow a fluid to communicate therethrough, or may be connection members (so-called glands) coupled to end portions of such long pipes by welding or the like.

Flat ring-shaped metal gasket 6 is disposed between connection pipes 1a and 1b. In the completed state shown in FIGS. 2A, 2B, metal gasket 6 is in contact with and pressed by projections 4a, 4b from both sides.

Figure 3:
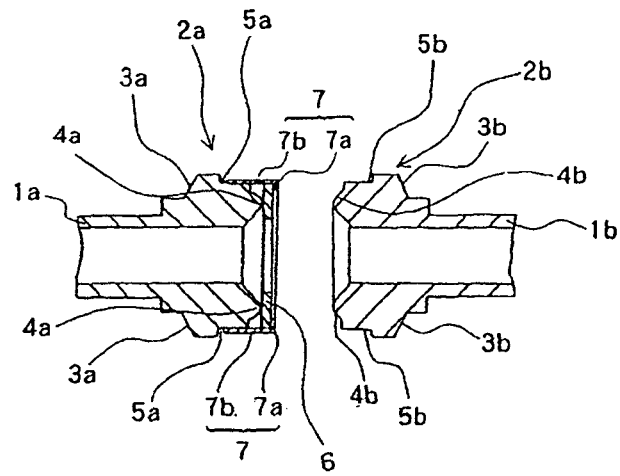
[FIG. 3] A front cross-sectional view showing an assembly steps of the fitting structure of the first embodiment of the present invention
Figure 4:
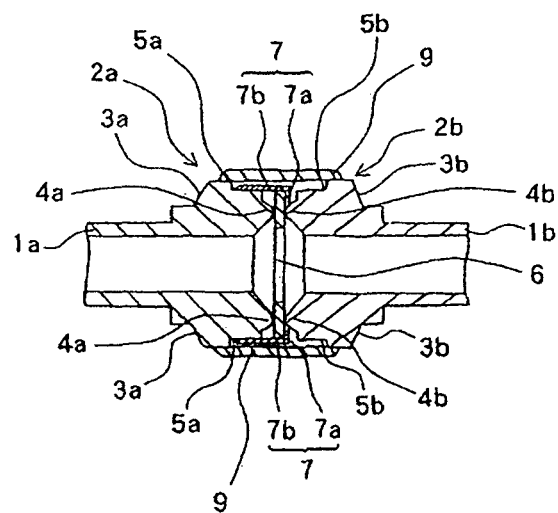
[FIG. 4] A front cross-sectional view showing an assembly steps subsequent to FIG. 3, of the fitting structure of the first embodiment of the present invention

Holder 7 is held on one connection pipe 1a, and metal gasket 6 is held on one connection pipe 1a by this holder 7. As shown in FIGS. 3, 4, holder 7 comprises craw-shaped engagement section 7a extending radially inward which is provided at one end portion of tubular section 7b. Tubular section 7b has a shape and dimensions which allow tubular section 7b to fit on step 5a formed on connection pipe 1a. The inner diameter of engagement section 7a is smaller than the outer diameter of metal gasket 6, so that engagement section 7a can be engaged with metal gasket 6. As such, engagement section 7a is in engagement with outer periphery of metal gasket 6, metal gasket 6 is housed within holder 7, and tubular section 7b is fitted on step 5a of connection pipe 1a. In this way, holder 7 and metal gasket 6 are held in connection pipe 1a. In this event, metal gasket 6 has one face stopped by engagement section 7a and the other face abutted to the leading end of projection 4a of connection pipe 1a. In this regard, engagement section 7a may be provided over the whole circumference of one end portion of tubular section 7b, or may be formed only along a part of the inner periphery of tubular section 7b.

Connection pipe 1b is arranged to be opposite to connection pipe 1a, and projection 4b abuts to one face of metal gasket 6 which is held at connection pipe 1a by holder 7, as described above. Center ring 9 is mounted to surround the outer periphery of each flange 2a, 2b of connection pipes 1a, 1b which are opposite to each other in this way. In this regard, both flanges 2a, 2b are in the same shape and in the same dimension, and are fitted in center ring 9 substantially without any gap.

Figure 5:
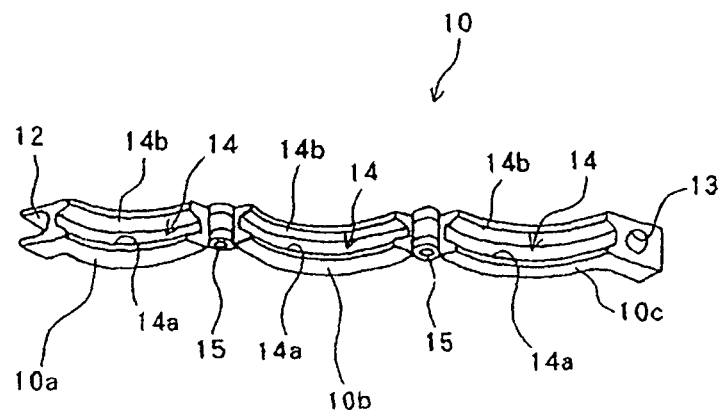
[FIG. 5] A perspective view of a clamp ring used in the fitting structure of the first embodiment of the present invention in a state in which a fastening member is removed and the fitting structure is opened

In the configuration described above, an assembly composed of connection pipes 1a, 1b, metal gasket 6, holder 7, and center ring 9 is held by clamp ring 10. As shown in FIG. 5, clamp ring 10 comprises a plurality of segments (three segments in this embodiment) 10a-10c coupled in a line. Adjacent segments are pivotally coupled to each other such that they can pivot relative to each other around shaft 15. Each shaft 15 is parallel with one another and perpendicular to the direction in which each segment 10a-10c opens and closes. Specifically, central segment 10b is pivotally connected to segment 10a at one end and to segment 10c at the other end such that they can pivot relative to each other around shafts 15. Therefore, when segments pivot such that segment 10a at one end comes closer to segment 10c at the other end, a ring shape can be configured as shown in FIG. 2B.

The inner periphery of each segment 10a-10c is provided with groove 14 which has corresponding slopes 14a, 14b corresponding to slopes 3a, 3b of connection pipes 1a, 1b. This groove 14 has a shape and dimensions to house a trapezoidal section which has both sides defined by slopes 3a, 3b when both connection pipes 1a, 1b are arranged in close proximity to be opposite so that they are opposite to each other, as described above.

Segment 10a at one end accommodates thread section 11a of bolt 11 which is a fastening member, and is provided with groove-shaped cutout 12 of a size which does not allow head section 11b to pass therethrough. Cutout 12 comprises enlarged section 12a for housing head section 11b of bolt 11. Segment 10c at the other end is provided with threaded hole 13 which thread section 11a of bolt 11 is screwed into. In this regard, in each drawing, the male thread and female thread are omitted in the illustration.

In a state in which a ring shape is configured with each segment 10a-10c as described above, head section 11a of bolt 11 is housed and stopped in enlarged section 12a of cutout 12 of segment 10a at one end, and thread section 11b is inserted into threaded hole 13 of segment 10c at the other end through cutout 12 and screwed into threaded hole 13. In this way, each segment 10a-10c can be fixed to each other. In the completed state shown in FIGS. 2A, 2B, flanges 2a, 2b are disposed in the interior of each segment 10a-10c and are opposite to each other across metal gasket 6 and holder 7, and the trapezoidal section which has both sides defined by both slopes 3a, 3b is inserted into groove 14. Then, as described above, bolt 11 is inserted into threaded hole 13 of segment 10c at the other end through cutout 12 and screwed into threaded hole 13 for fixation. In this configuration, as bolt 11 is threaded deeper into threaded hole 13, corresponding slopes 14a, 14b slide on slopes 3a, 3b to drive the trapezoidal section deeper into groove 14 in a wedge fashion, causing flanges 2a, 2b of connection pipes 1a, 1b to come closer to each other. Consequently, projections 4a, 4b apply larger contact pressures to metal gasket 6. As a result, airtightness is increased due to metal gasket 6 coming into close contact with projections 4a, 4b. Taking advantage of this principle, the desired airtightness can be provided by appropriately adjusting the amount by which bolt 11 will be screwed into threaded hole 13. In this way, the fitting structure of this embodiment shown in FIGS. 2A, 2B is configured.

Next, a description will be given of a method of assembling this fitting structure.

First, as shown in FIG. 3, engagement section 7a of holder 7 is engaged on the outer periphery of metal gasket 6, and metal gasket 6 is inserted in tubular section 7b. In this state, tubular section 7b is fitted on step 5a of one connection pipe 1a. In this way, metal gasket 6 is held by connection pipe 1a through holder 7. In this regard, by having formed holder 7, metal gasket 6, and step 5a with high accuracy, the position of metal gasket 6 can be accurate and metal gasket 6 can be firmly held by connection pipe 1a. In this way, metal gasket 6 can be aligned to connection pipe 1a by using holder 7.

Next, as shown in FIG. 4, connection pipe 1b is arranged opposite to and in close proximity to connection pipe 1a, and projections 4a, 4b are brought into contact with both sides of metal gasket 6, respectively. In this state, center ring 9 is mounted to surround the outer peripheries of flanges 2a, 2b of both connection pipes 1a, 1b. In this way, connection pipe 1b can be aligned to connection pipe 1a which holds metal gasket 6 accurately in position such that it does not shift in a direction orthogonal to the longitudinal direction of connection pipes 1a, 1b. At this time, however, each member has not yet been fixed, though each member is generally in an appropriate positional relationship, so that high airtightness has not yet been provided.

Figure 6A:
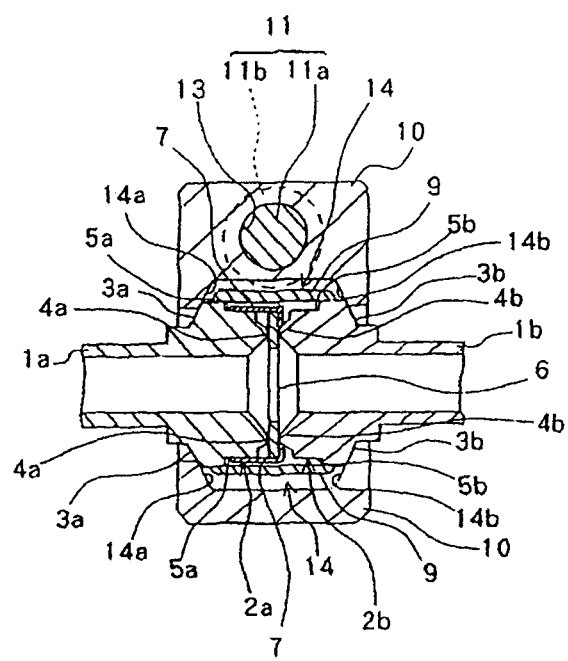
[FIG. 6A] A front cross-sectional view showing an assembly steps subsequent to FIG. 4, of the fitting structure of the first embodiment of the present invention
Figure 6B:
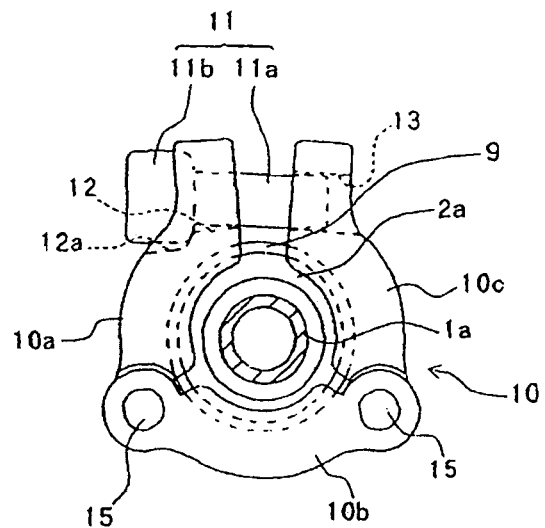
[FIG. 6B] A side view showing the assembly steps subsequent to FIG. 4, of the fitting structure of the first embodiment of the present invention

Then, each member is firmly fixed by clamp ring 10 to enhance the airtightness of the connection of connection pipes 1a and 1b. Each segment 10a-10c in the opened state as shown in FIG. 5 is closed in order to make a ring shape to enclose flanges 2a, 2b of each connection pipe 1a, 1b in the interior. In this event, as shown in FIGS. 6A, 6B, the trapezoidal section having both sides defined by slopes 3a, 3b of flanges 2a, 2b is inserted into groove 14. Then, as described above, bolt 11 is inserted into threaded hole 13 of segment 10c at the other end through cutout 12 and screwed into threaded hole 13 for fixation.

As shown in FIGS. 6A, 6B, at the time when bolt 11 is inserted into threaded hole 13 by a small amount, the spacing between segment 10a at one end and segment 10c at the other end is not yet sufficiently reduced. In other words, the ring shape defined by respective segments 10a-10c (ring shape defined by groove 14) is not sufficiently reduced in inner diameter. Accordingly, the trapezoidal section having both sides defined by slopes 3a, 3b of flanges 2a, 2b is inserted into groove 14 by a small amount. For this reason, flanges 2a and 2b are not yet in close proximity to each other, as viewed in the longitudinal direction of connection pipes 1a, 1b. In the state shown in FIGS. 6A, 6B, though projections 4a, 4b are in contact with both sides of metal gasket 6, their contact pressures are low, and sufficient airtightness has not yet been provided to block the communication of gas, so that the fitting structure is still unsatisfactory.

Thus, bolt 11 is further screwed deeper into threaded hole 13. Then, as bolt 11 is screwed into threaded hole 13 by a large amount as shown in FIGS. 2A, 2B, the spacing between segment 10a at one end and segment 10c at the other end is sufficiently reduced. Then, the ring shape defined by respective segments 10a-10c (ring shape defined by groove 14) is sufficiently reduced in inner diameter. Accordingly, the trapezoidal section having both sides defined by slopes 3a, 3b of flanges 2a, 2b is inserted into groove 14 by a large amount. Consequently, the spacing between flanges 2a and 2b is sufficiently reduced as viewed in the longitudinal direction of connection pipes 1a, 1b. In this state, projections 4a, 4b are in contact with both sides of metal gasket 6 at large contact pressures, thus making it possible to block the communication of gas. Thus, sufficient airtightness can be provided in a fitting structure.

The amount by which bolt 11 needs to be screwed into threaded hole 13 to obtain sufficient airtightness may be previously found through a preparative examination or the like. Alternatively, airtightness may be monitored at any time during the assembly step of the fitting structure (during the operation of screwing bolt 11 into threaded hole 13) and then the screwing operation may be stopped at the time when sufficient airtightness is obtained.

As shown in FIGS. 2A, 2B, at the time bolt 11 has been screwed into threaded hole 13 by a sufficient amount, cutout 12 is in alignment with threaded hole 13, so that bolt 11 is held horizontally. Then, head section 11b of bolt 11 is stably held within enlarged section 12a of cutout 12. However, during the screwing operation, i.e., at a stage at which the screwing amount is not yet sufficient, cutout 12 is not in alignment with threaded hole 13, as shown in FIGS. 6A, 6B, so that bolt 11 is held obliquely with respect to cutout 12. At this time, head section 11b of bolt 11 comes into partial and disproportional contact with the inner wall of enlarged section 12a of cutout 12. Thus, in this embodiment, respective contact portions of head section 11b and enlarged section 12a of cutout 12 are formed in a corresponding spherical shape having substantially the same radius curvature. In this way, because there is no corner in head section 11b or cutout 12, head section 11b or cutout 12 will not be damaged and the bolt will not be prevented from advancing, no matter what parts of contact portions of head section 11b or cutout 12 come into disproportional contact with each other in any manner.

In this regard, in this embodiment, not only connection pipe 1a is provided with step 5a, but also connection pipe 1b is provided with step 5b. While this step 5b is not necessary in terms of the configuration, this embodiment employs connection pipe 1b having step 5b in order to reduce the effort and cost of production by using a pair of connection pipes 1a, 1b in exactly the same configuration.

While this embodiment employs flanges 2a, 2b in a shape which is relatively thick and machined in a complicated manner, flanges may be formed in a simple shape having just the extended end faces of connection pipes 1a, 1b. However, slopes 3a, 3b are invariably provided for defining the trapezoidal section which is inserted into groove 14 to produce a wedge effect, as described above.

As shown in FIG. 14, the steps 5a, 5b of the respective flanges 2a, 2b define a non-recessed portions P1a, P1b and a recessed portions R1a, R1b. A first interspace S1 exists between the holder 7 and recessed portions R1a, R1b and the center ring 9. A second interspace S2 exists between the center ringer 9 and non-recessed portions P1a, P1b and the clamp ring 10.

Second Embodiment

Figure 7:
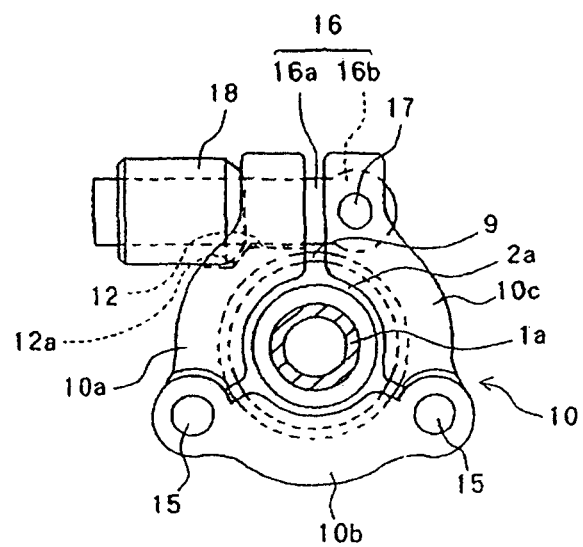
[FIG. 7] A side view of a fitting structure of a second embodiment of the present invention

FIG. 7 shows a second embodiment of a fitting structure of the present invention. Components similar to those of the first embodiment are designated by the same reference numerals as in the first embodiment, and descriptions thereof are omitted.

In this embodiment, eyebolt 16 is used in place of bolt 11. This eyebolt 16 comprises thread section 16a, and stopper section 16b pivotally attached to segment 10c with pin 17. Thread section 16a can be inserted into cutout 12 of segment 10a. Then, nut 18 is meshed with thread section 16a, and nut 18 comes into engagement with enlarged section 12a of cutout 12. Respective contact portions of nut 18 and enlarged section 12a of cutout 12 are formed in corresponding spherical shape having substantially the same radius of curvature.

The fitting structure of this embodiment can provide effects similar to the first embodiment, and simplify assembling operations by using eyebolt 16.

According to the fitting structures of the first and second embodiments of the present invention described above, high airtightness can be accomplished by bringing projections 4a, 4b of flanges 2a, 2b into contact with both sides of metal gasket 6. Moreover, when flanges 2a, 2b are fixed using clamp ring 10, no force acts to rotate connection pipes 1a, 1b themselves, so that connection pipes 1a, 1b will not be twisted. As a result, no friction occurs between metal gasket 6 and projections 4a, 4b, so that no particles occur. Even with long-term use, or even if each member slightly expands or contracts due to fluctuations in temperature, connection pipes 1a, 1b will not rotate relative to metal gasket 6, without causing friction, so that no particles will occur. According to this fitting structure, not only high airtightness from the outside can be provided, but also the occurrence of impurities can be prevented in the interior. This is suitable when fluid needs to flow with extremely high accuracy, particularly in the gas supply section of a semiconductor manufacturing apparatus or the like.

Third Embodiment

Next, a third embodiment of the present invention will be described. Components similar to those of the first and second embodiments are designated by the same reference numerals as in the first and second embodiments, and descriptions thereof are omitted.

Figure 8A:
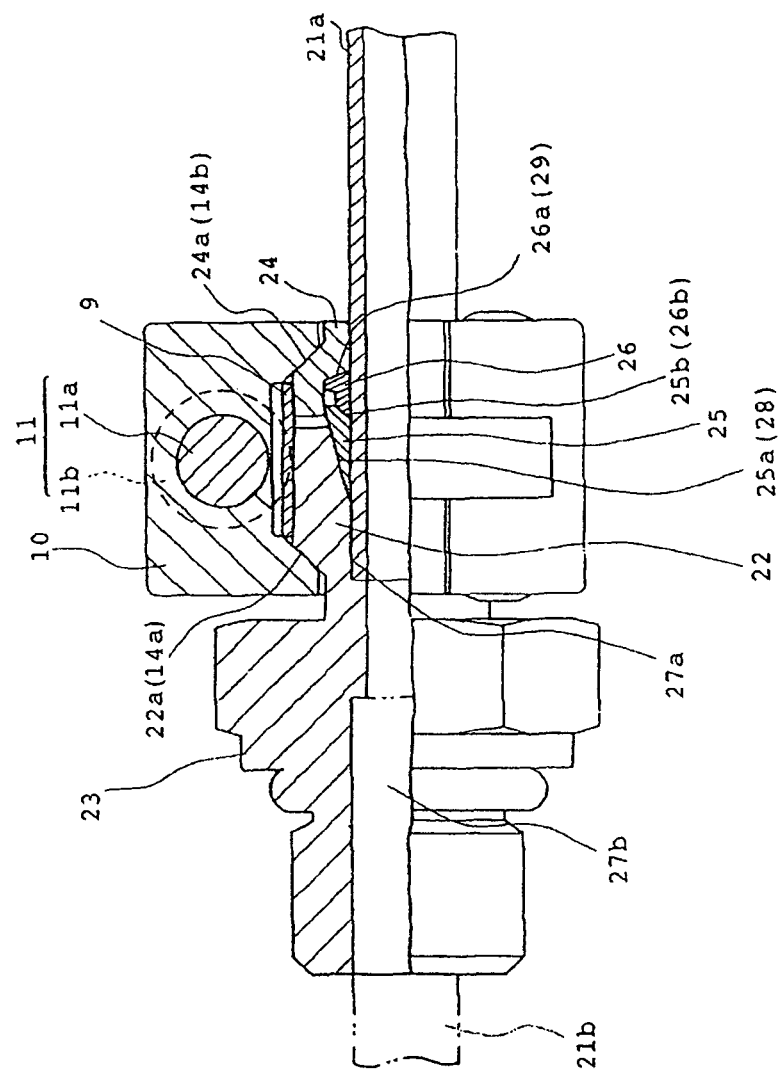
[FIG. 8A] A front cross-sectional view of a fitting structure of a third embodiment of the present invention
Figure 8B:
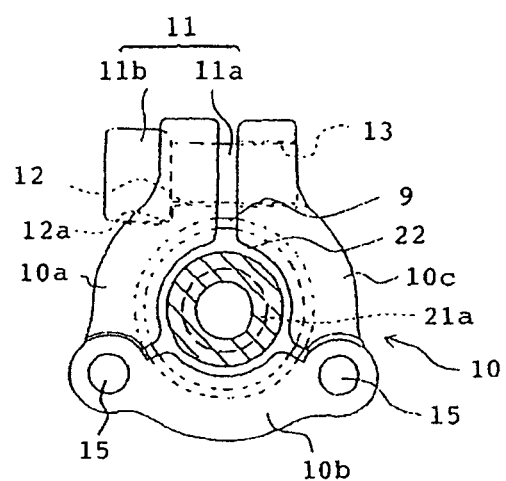
[FIG. 8B] A side view of the fitting structure of the third embodiment of the present invention
Figure 9:
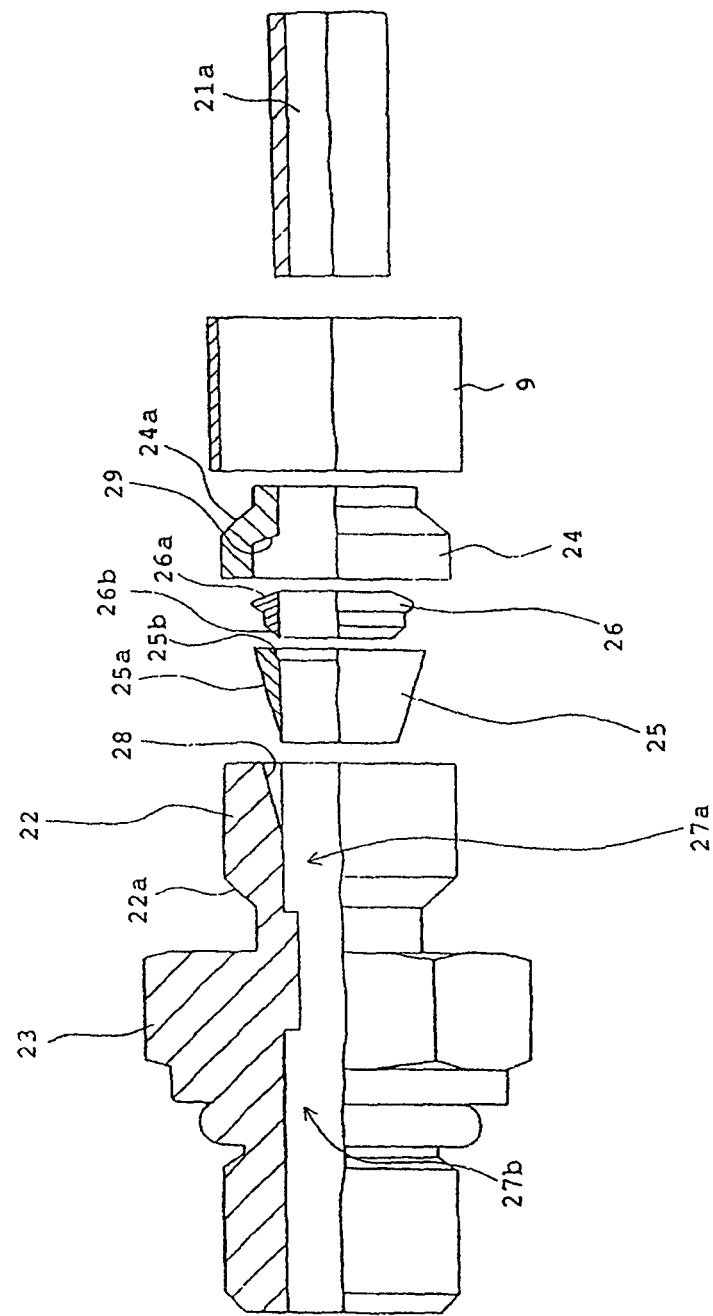
[FIG. 9] A front view of the fitting structure except for a clamp ring, of the third embodiment of the present invention, in a disassembled state

FIGS. 8A, 8B show the fitting structure of this embodiment in a completed state. FIG. 9 shows an exploded view of this fitting structure except for clamp ring 10. The fitting structure of this embodiment is intended to hermetically connect connection pipe 21a to another member, for example, another connection pipe 21b indicated by two-dot-chain lines. This fitting structure comprises fitting body 23 with fitting body side flange member 22 integrally provided at a leading end portion thereof, a connection pipe side flange member 24, front ferrule 25 and back ferrule 26, center ring 9, and clamp ring 10.

Fitting body 23 is provided with insertion section 27a for inserting connection pipe 21a thereinto. Further, an inclined cutout face 28 is formed on the inner periphery of the leading end portion of fitting body side flange member 22 of fitting body 23.

Connection pipe side flange member 24, which is arranged such that its leading end is opposite to the leading end of fitting body side flange member 22, is a hollow member through which connection pipe 21a can extends, and is formed with inclined cutout face 29 on the inner periphery of the leading end portion thereof.

The ferrule of this embodiment is of a double ferrule structure comprised of front ferrule 25 and back ferrule 26, and functions as a sealing ring positioned on the outer periphery of connection pipe 21a. Front ferrule 25 and back ferrule 26 are disposed within a space defined by the inner periphery of the leading end portion of fitting body side flange member 22 and the inner periphery of the leading end portion of connection pipe side flange member 24, which are arranged such that the leading ends are opposite to each other. Front ferrule 25 is in the wedge shape which has a first engagement face 25a and second engagement face 25b on the side opposite to first engagement face 25a. First engagement face 25a is a slope at substantially the same angle as cutout face 28 of fitting body side flange member 22 of fitting body 23, and can be engaged with cutout face 28. However, first engagement face 25a is longer than cutout face 28 of fitting body side flange member 22 of fitting body 23. On the other hand, back ferrule 26 is also in the wedge shape which has a first engagement face 26a, and second engagement face 26b on the side opposite to first engagement face 26a. First engagement face 26a is a slope at substantially the same angle as cutout face 29 of connection pipe side flange member 24, and can be engaged with cutout face 29.

Figure 10A:
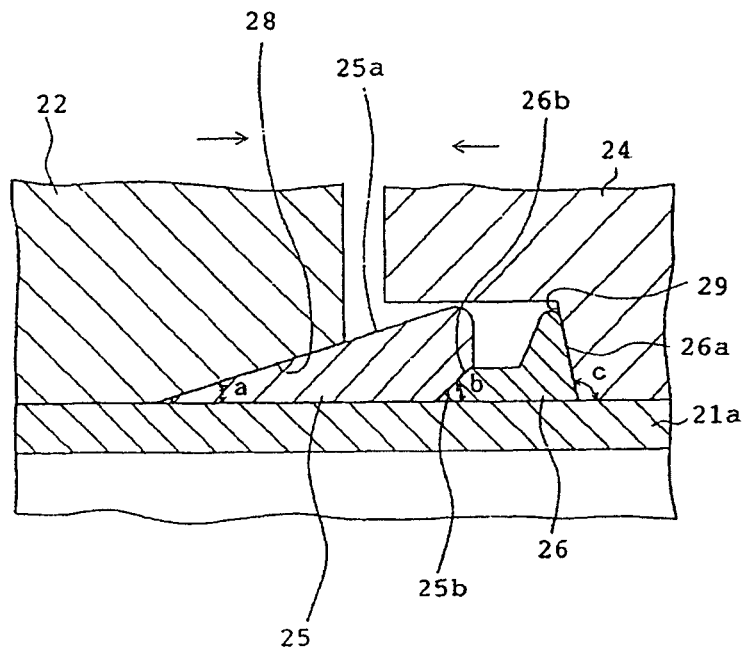
[FIG. 10A] An enlarged front cross-sectional view of a portion of a ferrule in the fitting structure of the third embodiment of the present invention during assembly

In this embodiment, the angle of each engagement face and cutout face is defined in the following manner. As shown in FIG. 10A, each of cutout face 28 of fitting body side flange member 22 of fitting body 23 and first engagement face 25a of front ferrule 25 in engagement with cutout face 28 forms an angle "a" with the longitudinal direction of connection pipe 21a, as viewed from back ferrule 26. Each of second engagement face 25b of front ferrule 25 and second engagement face 26b of back ferrule 26 in engagement with second engagement face 25b forms angle "b" with the longitudinal direction of connection pipe 21a as viewed from back ferrule 26. In this event, angle "a" is smaller than angle "b" and is acute angle. On the other hand, each of cutout face 29 of connection pipe side flange member 24 and first engagement face 26a of back ferrule 26 in engagement with cutout face 29 forms angle "c", which is an obtuse angle larger than 90 degrees, with the longitudinal direction of connection pipe 21a, as viewed from back ferrule 26. Accordingly, part of front ferrule 25 closer to first engagement face 25a produces a wedge effect such that it penetrates into the cutout of fitting body side flange member 22 of fitting body 23. Part of back ferrule 26 closer to first engagement face 26a has a wedge effect such that it penetrates into the cutout of connection pipe side flange member 24. Further, part of back ferrule 26 closer to second engagement face 26b has a wedge effect such that it penetrates into the interior of part of front ferrule 25 closer to second engagement face 25b.

As shown in FIG. 8A, fitting body side flange member 22 and connection pipe side flange member 24 have slopes 22a, 24a, respectively, which are downwardly inclined toward the side opposite to the leading end from each outer periphery. Slopes 22a, 24a of fitting body side flange member 22 and connection pipe side flange member 24 are provided on the side opposite to the opposite face of respective flange members 22a, 24a. Then, in a manner similar to the first embodiment shown in FIGS. 2A-6B, as both flange members 22, 24 are arranged in close proximity such that their leading end faces are opposite to each other, a trapezoidal section with both sides defined by both slopes 22a, 24a is created. Center ring 9 is mounted to surround the outer peripheries of both flange members 22, 24 which are arranged in close proximity such that their leading end faces are opposite to each other in this way. In this regard, both flange members 22, 24 are the same in outer diameter dimensions, and are fitted in center ring 9 substantially without any interstice.

As described above, fitting body side flange member 22 of fitting body 23 and connection pipe side flange member 24 are arranged such that their leading ends are opposite to each other. Then, connection pipe 21a is inserted through connection pipe side flange member 24 into insertion section 27a of fitting body side flange member 22. Front ferrule 25 and back ferrule 26 are disposed within a space which is defined by the inner peripheries of the leading end portions of both flange members 22, 24. Center ring 9 is mounted to surround the outer peripheries of both flange members 22, 24. Then, clamp ring 10 is attached outside center ring 9. Clamp ring 10 is the same in configuration as the clamp ring of the first embodiment (see FIG. 5).

Figure 10B:
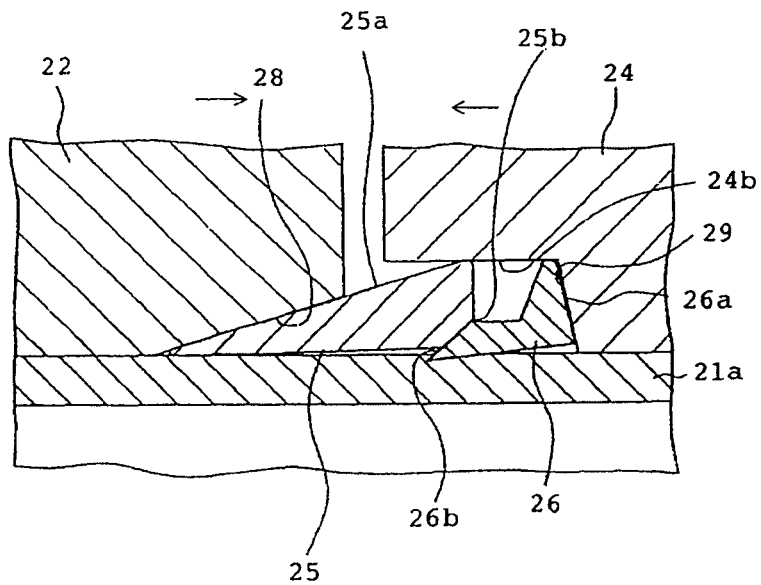
[FIG. 10B] An enlarged front cross-sectional view of the portion of the ferrule in the fitting structure of the third embodiment of the present invention in a completed state

As described above, when the leading end of fitting body side flange member 22 comes closer to the leading end of connection pipe side flange member 24, front ferrule 25 first comes into close contact with back ferrule 26 within the space defined by the inner peripheries of the leading end portions of both flange members 22, 24, as shown in FIG. 10A. Specifically, first engagement face 25a is pressed by cutout face 28 of fitting body side flange member 22, causing front ferrule 25 to move toward connection pipe 21a (to the right in FIG. 10A), and first engagement face 26a is pressed by cutout face 29 of connection pipe side flange member 24, causing back ferrule 26 to move toward fitting body 23 (to the left in FIG. 10A). As a result, front ferrule 25 and back ferrule 26 come into close contact with each other, with second engagement faces 25a and 26b in engagement with each other. Then, as the leading end of fitting body side flange member 22 comes closer to the leading end of connection pipe side flange member 24, first engagement face 25a is pressed by cutout face 28, causing front ferrule 25 to further move toward connection pipe 21a (to the right in FIG. 10A), as shown in FIG. 10B, and first engagement face 26a is pressed by cutout face 29, causing back ferrule 26 to move toward fitting body 23 (to the left in FIG. 10A). As a result, the length of a space between cutout face 28 and cutout face 29 becomes shorter than the total length of front ferrule 25 and back ferrule 26. In this event, since front ferrule 25 and back ferrule 26 are made of metal and therefore hardly contract, front ferrule 25 and back ferrule 26 slide relative to each other at engaged portions of second engagement faces 25b, 26b, thereby attempting to be kept in this space while expelling a pressing force. However, movements of the apexes of front ferrule 25 and back ferrule 26 are restricted by upper face 24b of the cutout at the leading end portion of connection pipe side flange member 24. As such, the end portion of second engagement face 26b of back ferrule 26 moves inward, and digs into the outer periphery of connection pipe 21a. In this way, front ferrule 25 and back ferrule 26 are stably held in this space. In this way, with one end portion of back ferrule 26 digging into the outer periphery of connection pipe 21a, front ferrule 25 and back ferrule 26 function as a seal ring which is in close contact with the outer periphery of connection pipe 21a to hermetically seal connected portions of connection pipe 21a and fitting body 23 against the outside. Also, with one end portion of back ferrule 26 digging into the outer periphery of connection pipe 21a, connection pipe 21a can be prevented from coming off both flange members 22, 24.

The relative sizes of the respective angles "a", "b", "c", as well as the hardness, dimensions, shape, and the like of front ferrule 25 and back ferrule 26 are calculated and set such that, in consideration of the hardness of connection pipe 21a, the hardness of both flange members 22, 24, and the shape of the cutout, one end portion of back ferrule 26 sufficiently digs into the outer periphery of connection pipe 21a in association with both flange members 22, 24 which are brought into close proximity by the action of clamp ring 10, as described above.

In this way, the fitting structure of this embodiment shown in FIG. 8A is configured. In this regard, connection pipes 21a, 21b may be parts of long pipes which allow a fluid to communicate therethrough, or may be connection members (so-called glands) coupled to end portions of such long pipes by welding or the like. Also, this embodiment is configured to allow connection pipe 21b to be inserted into insertion section 27b of fitting body 23, as an example of another member connected with connection pipe 21a. However, an outlet/inlet section having a tubular shape or an aperture shape which is provided in a housing of an apparatus for supplying or discharging a gas may be employed as another member connected with connection pipe 21a, and fitting body 23 may be mounted on this outlet/inlet section.

Describing next a method of assembling this fitting structure, connection pipe 21a that is to be connected is inserted into insertion section 27a of fitting body 23. Then, front ferrule 25, back ferrule 26, and connection pipe side flange member 24 are disposed on the outer periphery of connection pipe 21a either before or after the insertion of connection pipe 21a. Then, cutout face 28 at the leading end portion of fitting body side flange member 22 of fitting body 23 is placed opposite to cutout face 29 at the leading end portion of connection pipe side flange member 24 in close proximity across front ferrule 25 and back ferrule 26. In this state, center ring 9 is mounted to surround the outer peripheries of both flange members 22, 24. In a manner similar to the first embodiment, both flange members 22, 24 are aligned to each other by center ring 9 so as not to shift in the direction orthogonal to the longitudinal direction of connection pipe 21a. Subsequently, each member is firmly fixed using clamp ring 10 to enhance the airtightness of the connection through front ferrule 25 and back ferrule 6. As bolt 11 is sufficiently screwed into threaded hole 13, the spacing between the leading ends of both flange members 22, 24 becomes sufficiently small, as viewed in the longitudinal direction of connection pipe 21a. In this event, as shown in FIG. 10B, front ferrule 25 and back ferrule 26 are strongly pressed to each other so that back ferrule 26 sufficiently digs into the outer periphery of connection pipe 21a. In this way, connection pipe 21a can be prevented from coming off, and front ferrule 25 and back ferrule 26 function as a seal ring, thus making it possible to block gas from communicating with the outside of the fitting structure. Consequently, sufficient airtightness can be accomplished in a fitting structure.

Though omitted in the foregoing description, another member that is to be connected to connection pipe 21a is connected to fitting body 23 on the opposite side to fitting body side flange member 22 at an arbitrary timing. Specifically, in the example shown in FIG. 8A, additional connection pipe 21b which is the other member is inserted into insertion section 27b. The other member such as additional connection pipe 21b or the like may be fixed to fitting body 23 by a method such as screwing, welding, or the like. In this way, the fitting structure of the present invention can connect connection pipe 21a to another member such as additional connection pipe 21b and the like through an internal space (hollow section) of fitting body 23. Of course, in the fitting structure of this embodiment, a counterpart, to which connection pipe 21a is connected, is not limited to additional connection pipe 21b, but members in a variety of forms can be used such as an outlet/inlet section having a tubular shape or an aperture shape which is provided partially in a housing.

According to this fitting structure, front ferrule 25 and back ferrule 26 are brought into pressure contact with each other to cause one end portion of back ferrule 26 to dig into the outer periphery of connection pipe 21a, thereby making it possible to prevent connection pipe 21a from coming off and to accomplish highly hermetical sealing. Moreover, when flange members 22, 24 are fixed using clamp ring 10, no force acts to rotate connection pipe 21a itself, so that connection pipe 21a will not be twisted. As a result, even with long-term use, or even if each member slightly expands or contracts due to fluctuations in temperature, connection pipe 21a will not rotate relative to fitting body 23, and furthermore the airtightness will not be reduced. This is suitable when fluid needs to flow with extremely high accuracy, particularly in a gas supply section of a semiconductor manufacturing apparatus.

Fourth Embodiment

Figure 11:
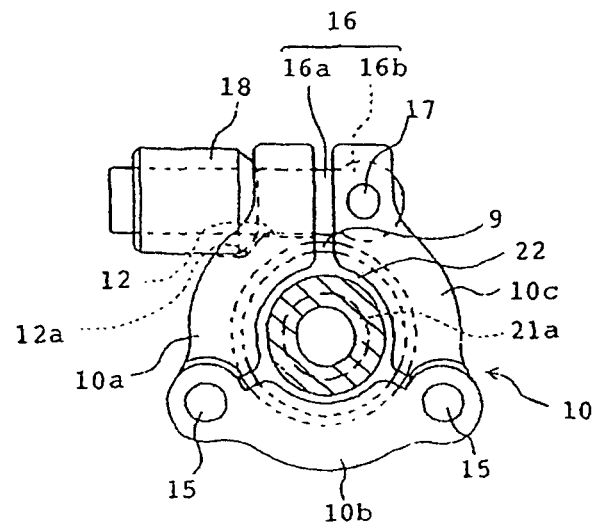
[FIG. 11] A side view of a fitting structure of a fourth embodiment of the present invention

Next, a description will be given of a fourth embodiment which is an exemplary modification to the third embodiment. In this embodiment, as shown in FIG. 11, bolt 11 is replaced with eyebolt 16 similar to that of the second embodiment shown in FIG. 7. In this event, the assembling operation can be simplified by using eyebolt 16. The rest of the configuration and the advantageous effects are the same as the third embodiment, so that descriptions thereof are omitted.

Fifth Embodiment

Figure 12:
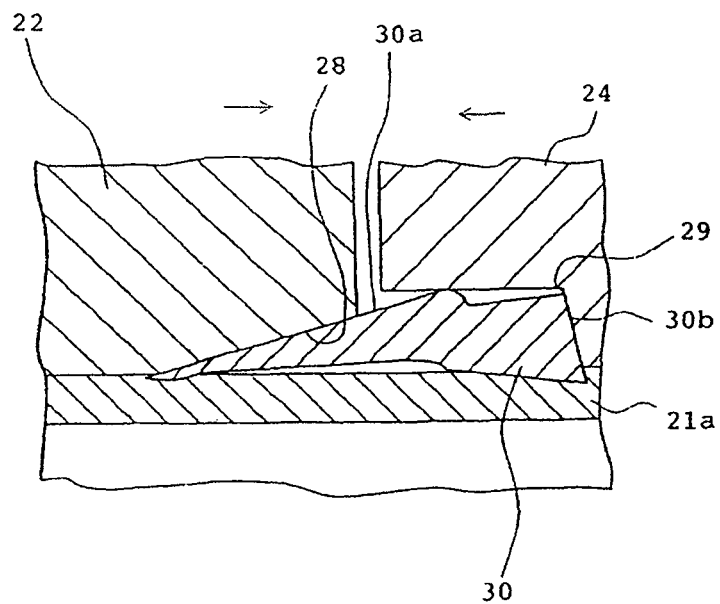
[FIG. 12] An enlarged front cross-sectional view of a portion of a ferrule in a fitting structure of a fifth embodiment of the present invention in a completed state

FIG. 12 shows a main portion of a fitting structure of a fifth embodiment of this invention. In this embodiment, a single ferrule structure is employed, not the double ferrule structure as in the third embodiment. Specifically, as shown in FIG. 12, single ferrule 30 is disposed within a space defined by the inner periphery of the leading end portion of fitting body side flange member 22 and the inner periphery of the leading end portion of connection pipe side flange member 24. Then, one engagement face 30a of this ferrule 30 is in engagement with cutout face 28 of the inner periphery of the leading end portion of connection pipe side flange member 24. This ferrule 30 is flexible to some degree. Therefore, when ferrule 30 is pressed by cutout faces 28, 29 of both flange members 22, 24 from both sides, ferrule 30 flexibly deforms so as to slightly bend, with both end portions of ferrule 30 digging into the outer periphery of connection pipe 21a, thus hermetically sealing the fitting structure against the outside.

Sixth Embodiment

Figure 13:
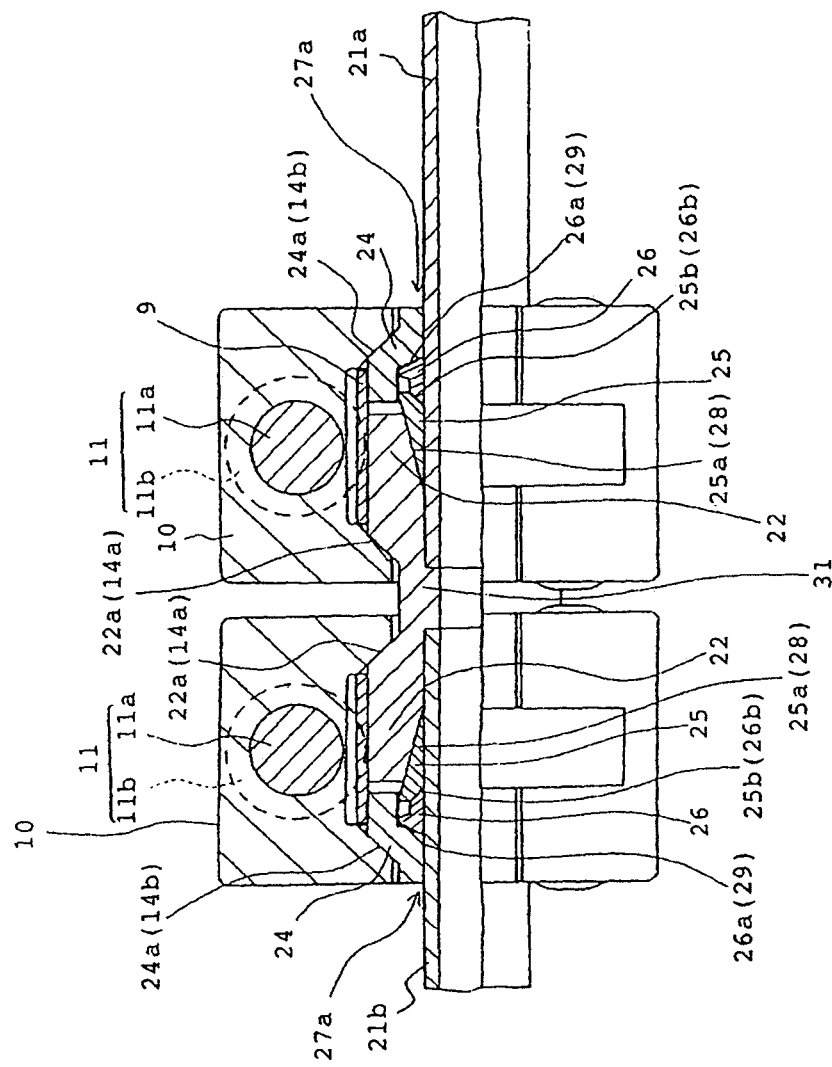
[FIG. 13] A front cross-sectional view of a fitting structure of a sixth embodiment of the present invention

FIG. 13 shows a fitting structure of a sixth embodiment of the present invention. Parts similar to those of the third embodiment are designated by the same reference numerals as in the third embodiment, and descriptions thereof are omitted.

The fitting structure of this embodiment is intended to connect a pair of connection pipes 21a, 21b to each other, and comprises two fitting structures of the third embodiment described above, arranged in bilateral symmetry. Fitting body 31 of this embodiment comprises fitting body side flange members 22 integrally provided at both end portions, respectively. Connection pipes 21a, 21b are inserted into a pair of insertion sections 27a, respectively, from both sides of this fitting body 31, and front ferrule 25, back ferrule 26, and connection pipe side flange member 24 are disposed, respectively, on the outer peripheries of these connection pipes 21a, 21b. Then, on both sides of fitting body 31, center ring 9 and clamp rings 10 are mounted respectively outside both flange members 22, 24, and both clamp rings 10 are fixed by bolt 11. In this event, front ferrule 25 and back ferrule 26 are brought into close contact with each other within both clamp rings 10, causing one end portion of back ferrule 26 to dig into the outer peripheries of connection pipes 21a, 21b (see FIG. 10B). As a result, connection pipes 21a, 21b can be prevented from coming off, and connection pipe 21a and connection pipe 21b can be connected through an internal space (hollow section) of fitting body 31 in a hermetically sealed state. The fitting structure of this embodiment is particularly suitable for use as an intermediate member for connecting connection pipes 21a and 21b.

The invention claimed is:
1. A fitting structure comprising:
a pair of connection pipes;
a flange formed at a leading end of each of the connection pipes, each flange comprising an annular projection, a recessed portion on an outer surface of the flange at a leading end of the flange, a non-recessed portion on the outer surface of the flange, and a step between the recessed portion and the non-recessed portion;

a flat ring-shaped metal gasket constructed and arranged to be in contact with each projection on opposite sides when the flanges are opposite to each other;

a holder constructed and arranged to hold the metal gasket, the holder comprising a tubular section within which the metal gasket is housed and a claw-shaped engagement section extending radially inward from one end portion of the tubular section, the holder being held by one of the connection pipes such that when the metal gasket is housed within the tubular section, the claw-shaped engagement section is in engagement with at least a part of the metal gasket, and the tubular section is fitted on the recessed portion of the connection pipe;

a center ring mountable to surround and contact outer peripheries of both non-recessed portions of the flanges when the flanges of each of the pair of connection pipes are opposite to each other across the metal gasket;

a clamp ring comprising three segments arranged in sequence and coupled such that adjacent segments are pivotally attached to one another, and such that the three segments define a ring shape constructed and arranged to cover and hold outer peripheries of the flanges when the flanges are disposed opposite to each other across the metal gasket and when a segment of the three segments positioned at one end and a segment positioned at another end are fixed to each other by a fastening member, a first interspace allowing the center ring to fit on the non-recessed portions of both flanges without coming into contact with the holder, the first interspace being formed between an outer surface of the holder and an inner surface of the center ring because of a difference between an inside diameter of the center ring and an outer diameter of the holder, and a second interspace allowing the clamp ring to contract when the segment positioned at the one end and the segment positioned at the another end are brought into close proximity with each other without coming into contact with the center ring, the second interspace being formed between an outer surface of the center ring and an inner surface of the clamp ring because of a difference between an outside diameter of the center ring and an inside diameter of the clamp ring which defines the ring shape when the segment positioned at the one end and the segment positioned at the another end are fixed to each other by the fastening member, wherein each flange has a slope which is downwardly inclined from the outer periphery of each flange respectively toward a side opposite to the leading end, each segment of the clamp ring has a corresponding slope respectively corresponding to the slope of said each flange on an inner periphery of each segment, and an inside diameter of the tubular section of the holder and an outside diameter of the metal gasket are equal to each other and are smaller than an inside diameter of the center ring.

2. The fitting structure according to claim 1, wherein the clamp ring is constructed and arranged such that when the fastening member brings the segment at the one end and the segment at the other end into closer proximity to each other, each segment of the clamp ring moves inward in a radial direction for more tightly holding the flanges to each other while each corresponding slope slides along each slope of each flange, the clamp ring defines the ring shape to cover and hold the overall outer peripheries of the flanges opposite to each other across the metal gasket, and when the flanges are tightly held to each other, the second interspace between the outer surface of the center ring and the inner surface of the clamp ring is maintained, and the first interspace between the outer surface of the holder and the inner surface of the center ring is maintained.

3. The fitting structure according to claim 1, wherein the fastening member is a bolt for screwing the segment at the one end to the segment at the other end, and the fastening member can bring both segments into closer proximity to each other as the bolt is screwed deeper.

4. The fitting structure according to claim 3, further comprising a head section of the bolt and a segment for engaging the head section of the bolt, wherein the segments have respective contact portions formed in a spherical shape.

5. The fitting structure according to claim 1, wherein the fastening member comprises:

an eyebolt comprising a stop section attached to one of two segments which are positioned at each side of the claim ring, a thread section extending from the stop section, and a nut in mesh with the thread section and in engagement with the other of the two segments, which are positioned at each side of the clamp ring, wherein as the thread section is screwed deeper into the nut, the segment which is in engagement with the nut can be brought closer to the segment to which the stop section is attached.

6. The fitting structure according to claim 5, wherein the nut and the other of the segments have respective contact faces formed in a spherical shape.

\* \* \* \* \*